(12) United States Patent
Hill et al.

(10) Patent No.: US 11,187,838 B2
(45) Date of Patent: Nov. 30, 2021

(54) SPECTRAL FILTER FOR HIGH-POWER FIBER ILLUMINATION SOURCES

(71) Applicant: KLA-Tencor Corporation, Milpitas, CA (US)

(72) Inventors: Andrew V. Hill, Berkley, CA (US); Ohad Bachar, Timrat (IL); Avi Abramov, Haifa (IL); Amnon Manassen, Haifa (IL)

(73) Assignee: KLA Corporation, Milpitas, CA (US)

( * ) Notice: Subject to any disclaimer, the term of this patent is extended or adjusted under 35 U.S.C. 154(b) by 753 days.

(21) Appl. No.: 15/665,911

(22) Filed: Aug. 1, 2017

(65) Prior Publication Data

US 2019/0033501 A1 Jan. 31, 2019

Related U.S. Application Data

(60) Provisional application No. 62/539,543, filed on Jul. 31, 2017.

(51) Int. Cl.
| | |
|---|---|
| *G02B 5/26* | (2006.01) |
| *F21V 8/00* | (2006.01) |
| *G01J 1/04* | (2006.01) |
| *G02B 5/20* | (2006.01) |
| *G01J 3/02* | (2006.01) |
| *G02B 6/293* | (2006.01) |
| *G01J 1/08* | (2006.01) |
| *G01J 3/12* | (2006.01) |

(52) U.S. Cl.
CPC .............. *G02B 5/26* (2013.01); *G01J 1/0451* (2013.01); *G01J 1/0488* (2013.01); *G01J 1/08* (2013.01); *G01J 3/024* (2013.01); *G01J 3/0208* (2013.01); *G01J 3/0218* (2013.01); *G02B 5/208* (2013.01); *G02B 6/0008* (2013.01); *G02B 6/29361* (2013.01); *G01J 2003/1213* (2013.01)

(58) Field of Classification Search
CPC ................................ F21V 7/0025; F21V 9/06
USPC ................................................... 362/551–582
See application file for complete search history.

(56) References Cited

U.S. PATENT DOCUMENTS

| | | | |
|---|---|---|---|
| 5,285,362 A * | 2/1994 | Sakata ...................... | F21V 9/00 362/263 |
| 6,125,223 A | 9/2000 | Drozdowicz | |
| 6,494,606 B1 * | 12/2002 | Ferrante .................. | F21V 21/30 362/583 |

(Continued)

OTHER PUBLICATIONS https://www.thorlabs.de/catalogPages/715.pdf (Year: 1999).*
International Search Report and Written Opinion dated Nov. 15, 2018 for PCT/US2018/043211.

*Primary Examiner* — William J Carter
(74) *Attorney, Agent, or Firm* — Suiter Swantz pc llo

(57) ABSTRACT

A spectral filter includes a curved filtering element including a concave surface forming a portion of a sphere. The concave surface may be positioned to receive light diverging from an output face of an optical fiber located at a first location proximate to a center of the sphere corresponding to the concave surface. The concave surface may transmit a first portion of a spectrum of the light. The concave surface may further reflect and focus a second portion of the spectrum to a second location proximate to the center of the sphere. The spectral filter may further include a collector to direct the second portion of the spectrum away from the output face of the optical fiber.

34 Claims, 8 Drawing Sheets

(56) References Cited

U.S. PATENT DOCUMENTS

| | | | |
|---|---|---|---|
| 2004/0047561 A1 | 3/2004 | Tuda | |
| 2005/0229638 A1* | 10/2005 | Bonitz | C03B 11/02 65/304 |
| 2006/0227557 A1* | 10/2006 | Li | F21V 7/00 362/341 |
| 2006/0233493 A1 | 10/2006 | Mossberg | |
| 2007/0044364 A1* | 3/2007 | Sammut | F41G 1/473 42/122 |
| 2007/0091402 A1* | 4/2007 | Tomioka | G02B 3/04 359/201.1 |
| 2007/0230871 A1* | 10/2007 | Bidnyk et al. | G02B 6/34 385/37 |
| 2008/0137032 A1* | 6/2008 | Lawrence | B29D 11/00355 351/159.61 |
| 2014/0287147 A1* | 9/2014 | Bartl | C23C 18/1283 427/374.1 |
| 2015/0267032 A1* | 9/2015 | Hustad | H01L 31/02168 136/257 |

* cited by examiner

SPECTRAL FILTER FOR HIGH-POWER FIBER ILLUMINATION SOURCES

CROSS-REFERENCE TO RELATED APPLICATION

The present application claims the benefit under 35 U.S.C. § 119(e) of U.S. Provisional Application Ser. No. 62/539,543, filed Jul. 31, 2017, entitled HIGH POWER FIBER SPECTRAL FILTER, naming Andrew Hill, Ohad Bachar, Avi Abramov, and Amnon Manassen as inventors, which is incorporated herein by reference in the entirety.

TECHNICAL FIELD

The present application relates generally to the field of spectral filters and, more particularly, to the field of spectral filters for high-power broadband fiber lasers.

BACKGROUND

High-power broadband illumination sources may provide high spectral power across a wide range of wavelengths. However, some wavelengths emitted by a broadband illumination source may be undesirable or damaging for a particular application. For example, high-power infrared illumination may be absorbed by optical elements or optical cements leading to degradation and damage. Further, high-power fiber-based illumination sources such as, but not limited to, supercontinuum lasers may present particular challenges for spectral filtering due to high divergence angles of light exiting the output face of an optical fiber. For example, planar spectral filters placed normal to a diverging beam may redirect the unneeded wavelengths back to the output face of the fiber, potentially heating the fiber and leading to distortion or damage. Placing a planar spectral filter at an angle to a diverging beam may adversely impact beam quality and thus beam brightness by introducing aberrations (e.g., chromatic aberrations, astigmatism, and the like) to reflected light or transmitted light. Further, such a configuration may undesirably increase the separation distance between the fiber output face and a collimating lens and thus may undesirably increase the collimated beam size and thus the required size of subsequent optical components. Therefore, it may be desirable for a system and method that cures the shortcomings identified above.

SUMMARY

A spectral filter is disclosed in accordance with one or more illustrative embodiments of the present disclosure. In one illustrative embodiment, the spectral filter includes a curved filtering element including a concave surface forming a portion of a sphere. In another illustrative embodiment, the concave surface is positioned to receive light diverging from an output face of an optical fiber positioned at a first location proximate to a center of the sphere. In another illustrative embodiment, the concave surface transmits a first portion of a spectrum of the light. In another illustrative embodiment, the concave surface reflects and focuses a second portion of the spectrum to a second location proximate to the center of the sphere. In another illustrative embodiment, the spectral filter includes a collector to direct the second portion of the spectrum away from the output face of the optical fiber.

A filtered fiber illumination source is disclosed in accordance with one or more illustrative embodiments of the present disclosure. In one illustrative embodiment, the filtered fiber illumination source includes a fiber illumination source to provide illumination diverging from an output face of an optical fiber. In another illustrative embodiment, the filtered fiber illumination source includes a curved filtering element including a concave surface forming a portion of a sphere. In another illustrative embodiment, the concave surface is positioned to receive illumination diverging from the output face of the optical fiber. In another illustrative embodiment, the output face of the optical fiber is positioned at a first location proximate to a center of the sphere. In another illustrative embodiment, the concave surface transmits a first portion of a spectrum of the illumination. In another illustrative embodiment, the concave surface reflects and focuses a second portion of the spectrum to a second location proximate to the center of the sphere. In another illustrative embodiment, the filtered fiber illumination source includes a collector to direct the second portion of the spectrum away from the output face of the optical fiber.

A method for filtering illumination from an optical fiber is disclosed in accordance with one or more illustrative embodiments of the present disclosure. In one illustrative embodiment, the method includes receiving illumination from an output face of an optical fiber with a curved filtering element including a concave surface forming a portion of a sphere. In another illustrative embodiment, the concave surface is positioned to receive light diverging from an output face of an optical fiber positioned at a first location proximate to a center of the sphere. In another illustrative embodiment, the method includes transmitting, with the concave surface, a first portion of a spectrum of the light. In another illustrative embodiment, the method includes reflecting, with the concave surface, a second portion of the spectrum. In another illustrative embodiment, the method includes focusing, with the concave surface, the second portion of the spectrum to a second location proximate to the center of the sphere. In another illustrative embodiment, the method includes directing, with a collector, the second portion of the spectrum away from the output face of the optical fiber.

It is to be understood that both the foregoing general description and the following detailed description are exemplary and explanatory only and are not necessarily restrictive of the invention as claimed. The accompanying drawings, which are incorporated in and constitute a part of the specification, illustrate embodiments of the invention and, together with the general description, serve to explain the principles of the invention.

BRIEF DESCRIPTION OF DRAWINGS

The numerous advantages of the present disclosure may be better understood by those skilled in the art by reference to the accompanying figures in which.

DETAILED DESCRIPTION

Figure 1A:
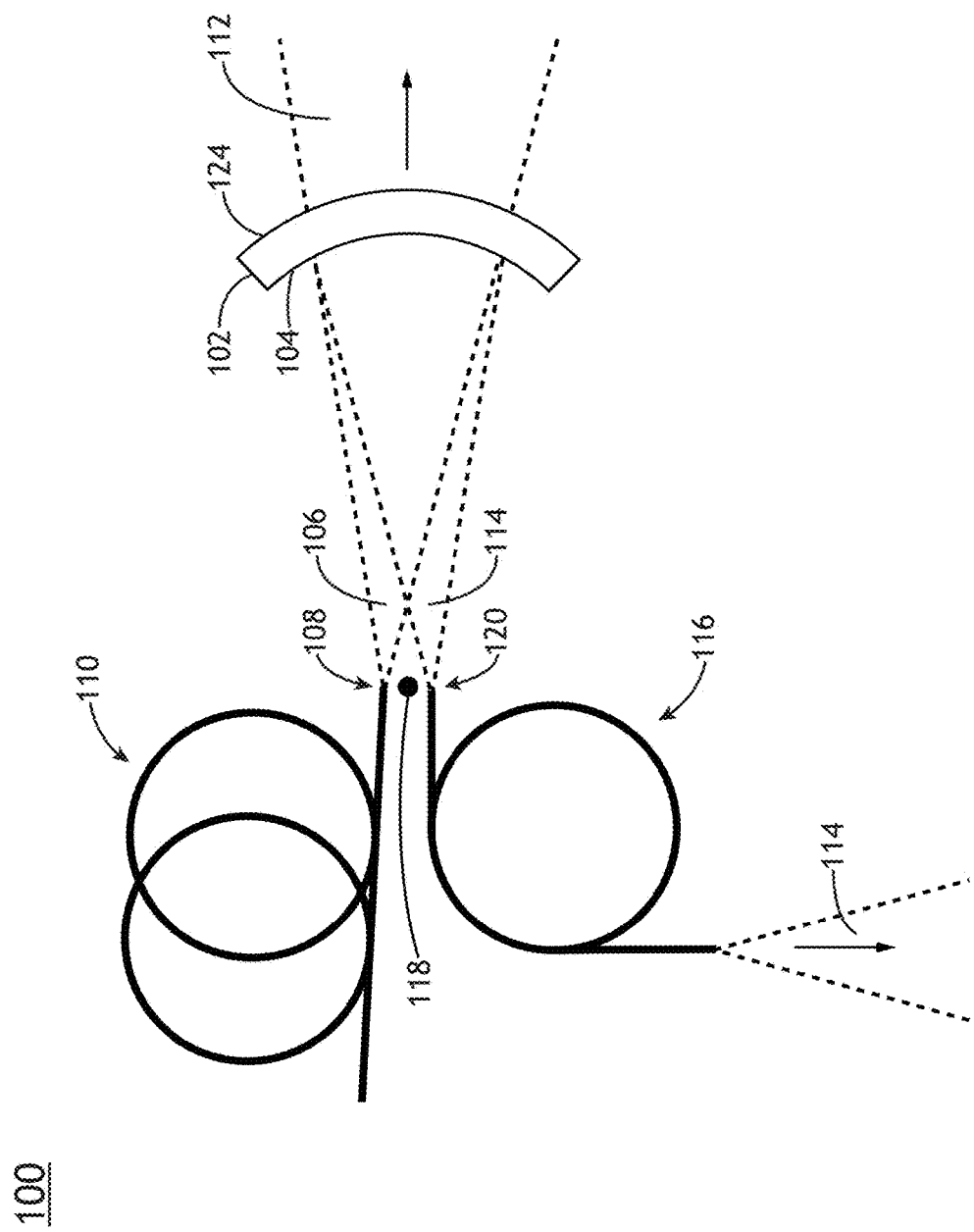
FIG. 1A is a conceptual view of a spectral filter, in accordance with one or more embodiments of the present disclosure.

Reference will now be made in detail to the subject matter disclosed, which is illustrated in the accompanying drawings. The present disclosure has been particularly shown and described with respect to certain embodiments and specific features thereof. The embodiments set forth herein are taken to be illustrative rather than limiting. It should be readily apparent to those of ordinary skill in the art that various changes and modifications in form and detail may be made without departing from the spirit and scope of the disclosure.

Embodiments of the present disclosure are directed to a brightness-preserving spectral filter for fiber-based light sources in which a concave spherical surface (e.g., a curved surface corresponding to a portion of a sphere) receives light diverging from an output face of an optical fiber located proximate to a center of the sphere, transmits a first portion of the spectrum of the received light, and reflects a second portion of the spectrum to a focused spot at a second location proximate to the center of the sphere. The concave spherical surface may preserve brightness in output beams including either the transmitted first portion of the spectrum or the reflected and focused second portion of the spectrum. Accordingly, any combination of the first spectrum (transmitted through the concave surface) or the second spectrum (light reflected by the concave surface) may be provided as output beams of the spectral filter.

Additional embodiments are directed to a fiber-based light source with a brightness-preserving spectral filter. In some applications such as, but not limited to, those involving high power illumination, it may be desirable to filter unneeded wavelengths from the output of an illumination source prior to the light impinging on external optical elements. For example, infrared wavelengths may be efficiently absorbed by many optical components (e.g., silica, quartz, borosilicate glass, and the like) or optical adhesives (e.g., cements, epoxies, and the like) and may thus induce heating, expansion, warping, or damage. By way of another example, ultraviolet wavelengths (e.g., extreme ultraviolet wavelengths) may be absorbed and may induce damage through the formation of color centers, solarization, or the like. In this regard, a collector may direct filtered light (e.g., the reflected second portion of the spectrum) from an input beam away from the output face of the optical fiber to prevent damage to the optical fiber as well as any external optical elements. Accordingly, a fiber-based light source with a brightness-preserving spectral filter may provide filtered illumination suitable for a particular application. Further, a fiber-based light source with a brightness-preserving spectral filter may be suitable as a first optical element to interact with illumination from a broadband illumination source. In this regard, the spectral filter may isolate the additional optical elements from unneeded wavelengths generated by the illumination source without adversely impacting the beam quality and/or focusing characteristics of the beam from the illumination source.

Further embodiments are directed to a spectral filter additionally including a collector to direct the second portion of the spectrum away from the output face of the optical fiber providing the light to be filtered. The concave surface may reflect the second portion of the spectrum of incident light to a focused spot near, but not overlapping with, the output face of the optical fiber. The collector may thus be positioned to receive and redirect the second portion of the spectrum away from the optical fiber to protect the optical fiber and/or to provide the second portion of the spectrum as a filtered output beam. For example, the collector may include an additional optical fiber positioned to receive the focused second portion of the spectrum and provide the filtered illumination as an output beam. By way of another example, the collector may include a mirror to redirect the second portion of the spectrum to additional optical elements (e.g., a beam dump to safely discard the second portion of the spectrum, a collimating optical element to provide a collimated output beam, or the like).

A brightness-preserving spectral filter may incorporate any type of material suitable for the transmission of diverging light from the optical fiber to the concave surface. Some embodiments of the present disclosure are directed to a spectral filter in which diverging light from the optical fiber propagates through gas (e.g., atmosphere, argon gas, a low vacuum, or the like) to reach the concave surface. For example, the concave surface may be a first surface of a curved optical element. In this regard, the first portion of the spectrum transmitted by the concave surface may propagate through the curved optical element and exit the curved optical element via an exit surface. Additional embodiments are directed to a spectral filter including a solid material (e.g., glass) fused or otherwise coupled to the output face of the optical fiber such that the diverging light from the fiber propagates through the solid material to the concave surface, which may operate as an exit surface for the first portion of the spectrum. It is recognized herein that a spectral filter fused or otherwise coupled to the output face of an optical fiber may provide a highly robust alignment of the spectral filter.

FIG. 1A is a conceptual view of a spectral filter 100, in accordance with one or more embodiments of the present disclosure. In one embodiment, the spectral filter 100 includes a curved filtering element 102 having a concave surface 104 for filtering an input beam 106 diverging from an output face 108 of an optical fiber 110. The concave surface 104 may filter the input beam 106 into a transmitted filtered beam 112 including a first portion of a spectrum of the input beam 106 and a reflected filtered beam 114 including a second portion of the spectrum of the input beam 106. Further, the concave surface 104 may transmit the transmitted filtered beam 112 and reflect the reflected filtered beam 114 such that the transmitted filtered beam 112 and the reflected filtered beam 114 are spatially separated. In another embodiment, the spectral filter 100 includes a collector 116

(e.g., an optical fiber, a mirror, or the like) to receive the reflected filtered beam 114 and direct the reflected filtered beam 114 away from the output face 108 of the optical fiber 110. Accordingly, any combination of the transmitted filtered beam 112, including the first portion of the spectrum of the input beam 106, or the reflected filtered beam 114, including the second portion of the spectrum, may be provided as filtered output beams.

The spectral filter 100 may be configured to accept the input beam 106 from any type of broadband illumination source suitable for providing an input beam 106 having a large range of wavelengths. In one embodiment, the broadband illumination source is a laser source. For example, the broadband illumination source may include, but is not limited to, a broadband laser source, a supercontinuum laser source, a white light laser source, or the like. In this regard, the broadband illumination source may provide an input beam 106 having high coherence (e.g., high spatial coherence and/or temporal coherence). In another embodiment, the broadband illumination source includes a laser-sustained plasma (LSP) source. For example, the broadband illumination source may include, but is not limited to, a LSP lamp, a LSP bulb, or a LSP chamber suitable for containing one or more elements that, when excited by a laser source into a plasma state, may emit broadband illumination. In another embodiment, the broadband illumination source includes a lamp source. For example, the broadband illumination source may include, but is not limited to, an arc lamp, a discharge lamp, an electrode-less lamp, or the like. In this regard, the broadband illumination source may provide an input beam 106 having low coherence (e.g., low spatial coherence and/or temporal coherence).

The broadband illumination source may further produce broadband illumination with any temporal profile. For example, the broadband illumination source may produce a continuous input beam 106, a pulsed input beam 106, or a modulated input beam 106.

In another embodiment, the concave surface 104 is a concave spherical surface. For example, the concave surface 104 may include a surface polished or otherwise shaped to correspond to a portion of a sphere. It is recognized herein that many optical surfaces such as, but not limited to, lenses are formed as spherical surfaces and that spherical surfaces may be fabricated within a high precision and manufacturing accuracy to minimize surface-induced aberrations. Accordingly, a spherical concave surface 104 may be fabricated with a corresponding precision and accuracy to provide filtering without introducing surface-induced aberrations into either the transmitted filtered beam 112 or the reflected filtered beam 114.

In another embodiment, the spectral filter 100 is configured to position the output face 108 of the optical fiber 110 proximate to the curvature center 118 of the sphere defining the curvature of the concave surface 104. Accordingly, the concave surface 104 may receive the diverging input beam 106 and focus the reflected filtered beam 114 to a corresponding focused spot 120 proximate to the curvature center 118 and separated from the output face 108. For example, a portion of the diverging input beam 106 from an output face 108 positioned a particular distance from the curvature center 118 in a certain direction may be reflected and focused to a spot located the same distance from the curvature center 118, but in the opposite direction. Further, the concave surface 104 may focus the reflected filtered beam 114 to a spot approximately the same size as the diameter of the core of the optical fiber 110.

The collector 116 may be any optical element or combination of optical elements suitable for receiving the reflected filtered beam 114 from the concave surface 104 and directing the reflected filtered beam 114 away from the optical fiber 110. In this regard, the collector 116 may prevent portions of the reflected filtered beam 114 from hitting the optical fiber 110, which may heat the fiber and/or any surrounding mounts, induce instabilities in the source of the input beam 106 (e.g., lasing instabilities caused by retroreflected radiation), or damage the output face 108. Further, the redirected reflected filtered beam 114 may be utilized as a filtered output beam by an external system. In one embodiment, as illustrated in FIG. 1A, the collector 116 includes an additional optical fiber configured to couple with and receive the reflected filtered beam 114.

Figure 1B:
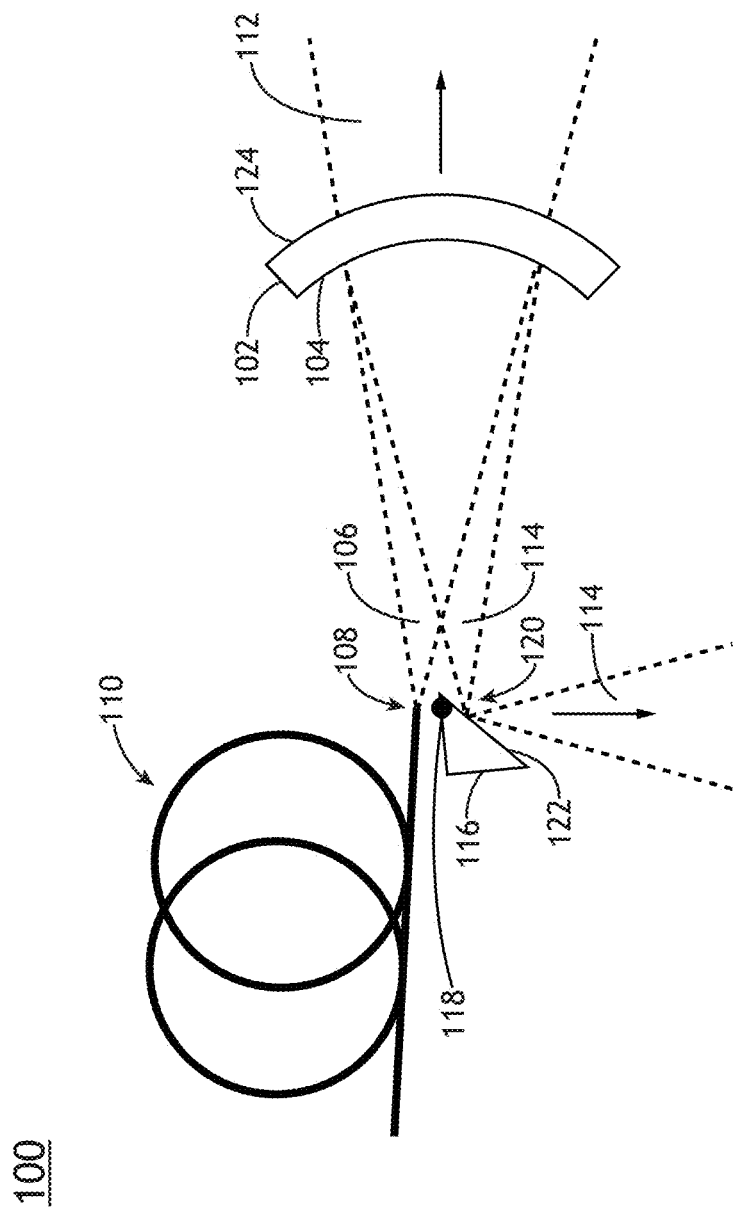
FIG. 1B is a conceptual view of a spectral filter with a collector mirror, in accordance with one or more embodiments of the present disclosure.

FIG. 1B is a conceptual view of a spectral filter 100 with a collector mirror, in accordance with one or more embodiments of the present disclosure. In one embodiment, the collector 116 includes a reflective surface 122 positioned to redirect the reflected filtered beam 114 away from the output face 108 of the optical fiber 110. The collector 116 may be located at any location suitable for redirecting the reflected filtered beam 114 away from the output face 108. For example, the collector 116 may be positioned to locate the reflective surface 122 at the focal spot of the reflected filtered beam 114. In this regard, the reflective surface 122 need only match or exceed the size of the focused spot. By way of another example, the collector 116 may be positioned to locate the reflective surface 122 near (e.g., on either side of) the focal spot of the reflected filtered beam 114. In this regard, the irradiance (e.g., energy per unit area) may be reduced based on a larger spot size of the reflected filtered beam 114 on the reflective surface 122. Accordingly, locating the reflective surface 122 away from the focal spot of the reflected filtered beam 114 may reduce the damage threshold requirements associated with the reflective surface 122 relative to locating the reflective surface 122 at the focal spot of the reflected filtered beam 114.

The reflective surface 122 may be any shape. In one embodiment, the reflective surface 122 is a planar surface, as illustrated in FIG. 1B. In another embodiment (not shown), the reflective surface 122 is a curved surface. In this regard, the curved reflective surface 122 may at least partially collimate the reflected filtered beam 114. Accordingly, the requirements for additional collimating optical elements may be reduced such that a desired beam size may be obtained.

The output face 108 of the optical fiber 110 from which the input beam 106 exits the optical fiber 110 may be placed at any location near the curvature center 118 suitable for providing physical separation between the output face 108 and the focused spot 120 of the reflected filtered beam 114.

In one embodiment, an edge of the optical fiber 110 is located at the curvature center 118 to mitigate off-axis aberrations induced by a shift of the output face 108 (from which the input beam 106 exits the optical fiber 110) from the curvature center 118. It is recognized herein that optical fibers may be fabricated with a wide range of cladding/coating configurations. For example, an optical fiber may typically include, but is not required to include, a core and a cladding in which the core has a refractive index higher than the cladding such that the optical fiber may support one or more propagation modes. Optical fibers may, but are not required to, include further coatings or protective coverings suitable for protecting the core and/or cladding from damage (e.g., mechanical damage, damage from moisture, and the like). Accordingly, an edge of the optical fiber 110 may include, but is not limited to, an outer diameter of the core, a cladding, or a coating.

Further, optical fibers may be fabricated with a wide range of sizes of the constituent components. For example, a single-mode fiber may include, but is not required to include, a core with a diameter in the range of 5-15 micrometers and a cladding with a diameter of approximately 125 micrometers. By way of another example, a multi-mode fiber may include, but is not required to include, a core with a diameter in the range of 25-90 micrometers and a cladding with a diameter of approximately 125 micrometers.

Figure 2:
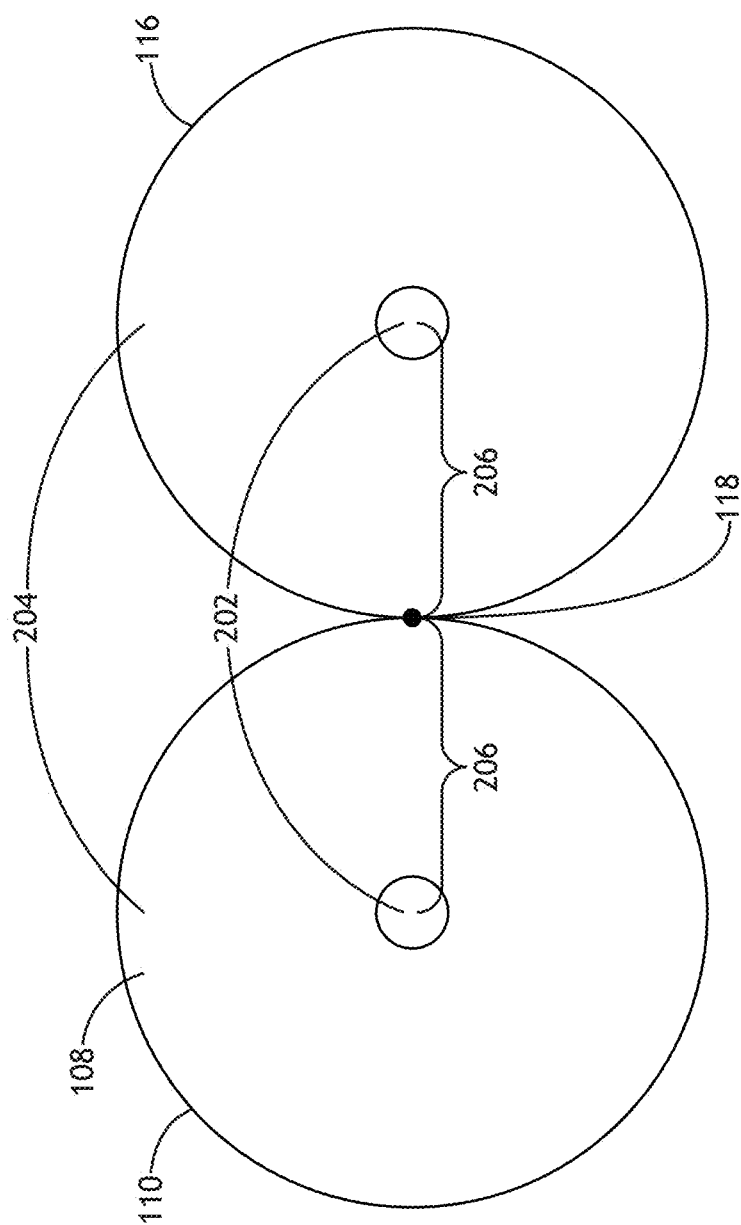
FIG. 2 is a profile view of a spectral filter with a collector configured to have a same geometry as an optical fiber for providing the input beam, in accordance with one or more embodiments of the present disclosure.

FIG. 2 is a profile view of a spectral filter 100 with a collector 116 configured to have a same geometry as an optical fiber 110 for providing the input beam 106, in accordance with one or more embodiments of the present disclosure. In one embodiment, the optical fiber 110 and the fiber collector 116 include a core 202 and a cladding 204. For example, additional coatings, if present, may be stripped. The center of the core 202 of the optical fiber 110 may be located at a distance 206 from the curvature center 118 equal to the radius of the optical fiber 110. Accordingly, the concave surface 104 may focus the reflected filtered beam 114 to a focused spot 120 located at a corresponding distance 206 from the curvature center 118 in the opposite direction. The collector 116 such as, but not limited to, a fiber collector 116 as illustrated in FIGS. 1A and 2 may thus be positioned to receive the reflected filtered beam 114.

It is to be understood, however, that the geometry of the optical fiber 110 and the collector 116 as illustrated in FIG. 2 and described in the associated paragraphs above is provided solely for illustrative purposes and should not be interpreted as limiting. The spectral filter 100 may include any configuration of the optical fiber 110 and the collector 116 suitable for physically separating the reflected filtered beam 114 from the output face 108 of the optical fiber 110. In one embodiment, the distance between the center of the output face 108 and the curvature center 118 is equal to the outer diameter of one or more coatings on the optical fiber 110. In another embodiment, the distance between the center of the output face 108 and the curvature center 118 is greater than the total outer diameter of the optical fiber 110. In this regard, a physical gap between the optical fiber 110 and the collector 116 may facilitate alignment of the spectral filter 100. In another embodiment, a fiber collector 116 has a different geometry (e.g., core diameter, cladding diameter, or the like) than the optical fiber 110. For example, a fiber collector 116 may have a smaller diameter than the optical fiber 110 such that the distance between the center of the output face 108 and the curvature center 118 may be smaller than the total outer diameter of the optical fiber 110. Further, in the case of a non-fiber collector 116 (e.g., a mirror as illustrated in FIG. 1B), the spectral filter 100 may include a wide range of configurations of the optical fiber 110 and the collector 116.

It is recognized herein that a spectral filter 100 with a concave surface 104 as described herein may preserve the brightness of the input beam 106 in the transmitted filtered beam 112 and/or the reflected filtered beam 114. For example, locating the output face 108 near the curvature center 118 (e.g., at a distance on the order of the radius of the optical fiber 110) may mitigate aberrations associated with the off-axis alignment of the output face 108 with respect to the curvature center 118 such that the reflected filtered beam 114 may have substantially the same beam quality and/or focusing characteristics as the input beam 106.

By way of another example, the concave surface 104 may provide the transmitted filtered beam 112 and/or the reflected filtered beam 114 without introducing aberrations (e.g., chromatic aberration, astigmatism, or the like) associated with a tilted planar spectral filter similarly positioned near the output face 108 to filter the diverging input beam 106. For instance, a tilted planar spectral filter may introduce chromatic spot shifts in both transmitted or reflected beams, astigmatism into a transmitted beam, or the like that may degrade the beam quality and/or focusing characteristics such that the resulting filtered beams may have diminished brightness and may not be focused with the same characteristics as the input beam 106.

In another embodiment, one or more additional surfaces of the spectral filter 100 are shaped to correct for or otherwise mitigate aberrations induced by the concave surface 104 such that the transmitted filtered beam 112 may have the same or substantially the same beam quality and/or focusing characteristics as the input beam 106. For example, an exit surface 124 of the curved filtering element 102, as illustrated in FIGS. 1A and 1B, may be shaped to mitigate aberration induced by the concave surface 104. By way of another example, the spectral filter 100 may include one or more additional optical elements (not shown) to modify the wavefront of the transmitted filtered beam 112 to mitigate aberrations induced by the concave surface 104.

The concave surface 104 may filter the incident input beam 106 using any technique suitable for providing the transmitted filtered beam 112 including the first portion of the spectrum of the input beam 106 and the reflected filtered beam 114 including the second portion of the spectrum. For example, the concave surface 104 may include one or more layers of dielectric and/or metallic materials suitable for filtering the input beam 106 according to a desired distribution.

In one embodiment, the concave surface 104 operates as a "cold mirror" (e.g., a reflecting low-pass filter) such that the transmitted filtered beam 112 transmitted by the concave surface 104 includes wavelengths higher than a selected cutoff wavelength and the reflected filtered beam 114 reflected by the concave surface 104 includes wavelengths lower than the selected cutoff wavelength. In another embodiment, the concave surface 104 operates as a "hot mirror" (e.g., a reflecting high-pass filter) such that the transmitted filtered beam 112 transmitted by the concave surface 104 includes wavelengths lower than a selected cutoff wavelength and the reflected filtered beam 114 reflected by the concave surface 104 includes wavelengths higher than the selected cutoff wavelength.

Figure 3A:
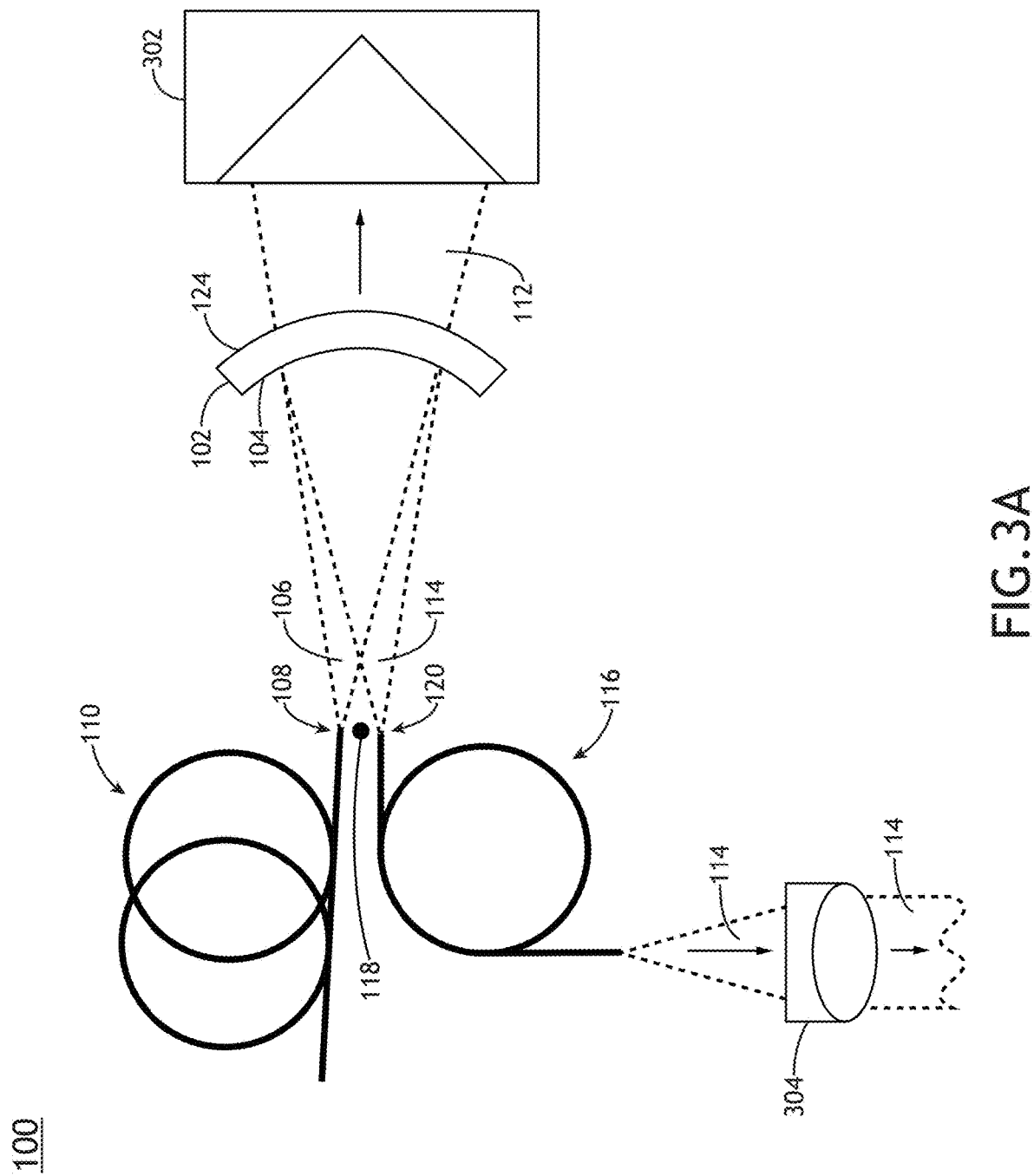
FIG. 3A is a conceptual view of a spectral filter configured with a beam dump in the path of the transmitted filtered beam, in accordance with one or more embodiments of the present disclosure.
Figure 3B:
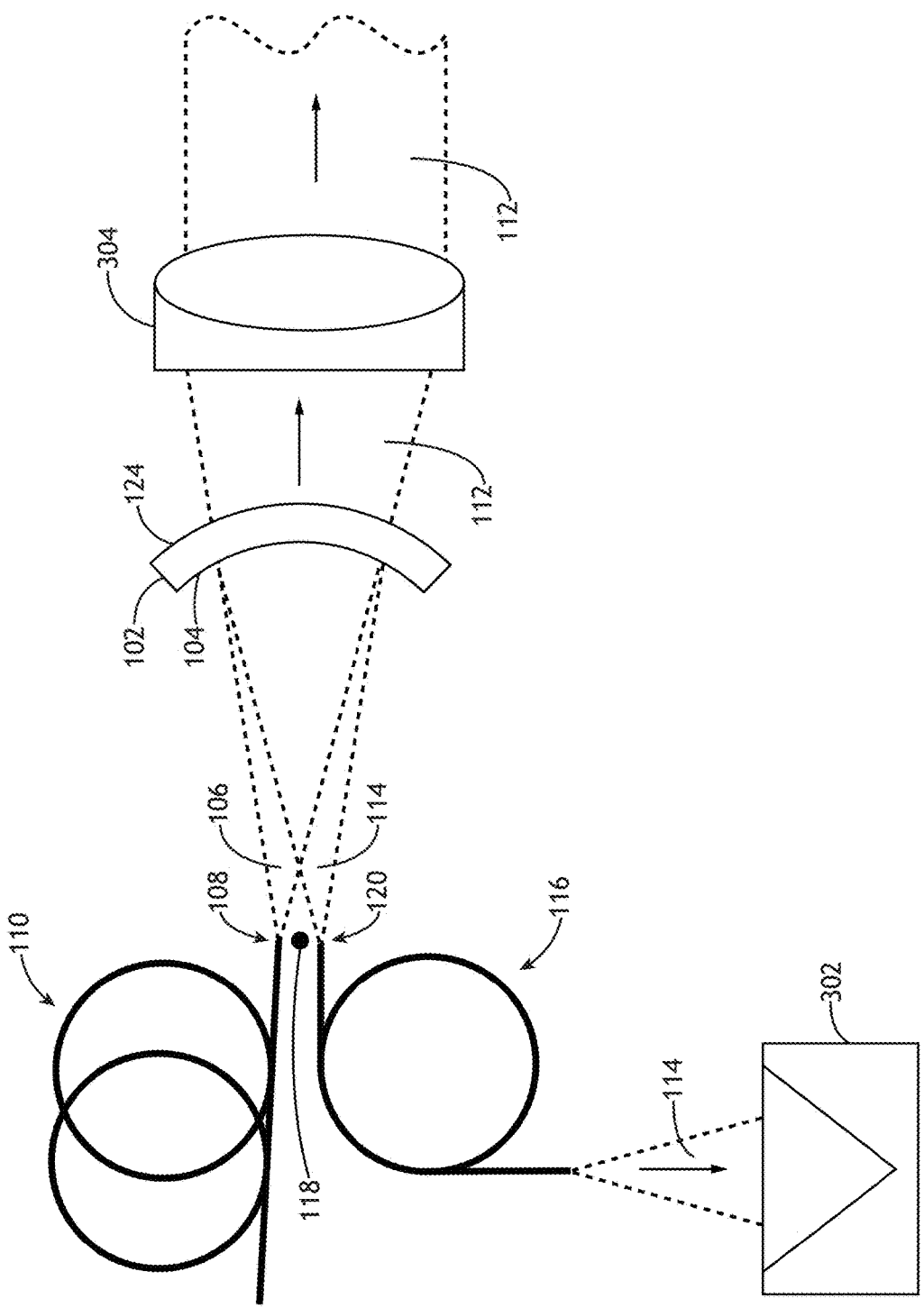
FIG. 3B is a conceptual view of a spectral filter configured with a beam dump in the path of the reflected filtered beam, in accordance with one or more embodiments of the present disclosure.

In some applications, the spectral filter 100 may include a beam dump to safely discard unneeded wavelengths from the spectrum of the input beam 106. FIG. 3A is a conceptual view of the spectral filter 100 configured with a beam dump 302 in the path of the transmitted filtered beam 112, in accordance with one or more embodiments of the present disclosure. Accordingly, the reflected filtered beam 114 may be provided as a filtered output beam. For example, one or more collimating lenses 304 may collimate the reflected filtered beam 114 provided by the collector 116 to provide a filtered output beam. FIG. 3B is a conceptual view of the spectral filter 100 configured with a beam dump 302 in the path of the reflected filtered beam 114, in accordance with one or more embodiments of the present disclosure. Accordingly, the transmitted filtered beam 112 may be provided as a filtered output beam. For example, one or more collimating lenses 304 may collimate the transmitted filtered beam 112 from the curved filtering element 102 to provide a filtered output beam.

The spectral filter 100 may include a beam dump in the path of either the transmitted filtered beam 112 or the reflected filtered beam 114. Further, a beam dump 302 may be used in combination with the concave surface 104 configured as either a "cold mirror" or a "hot mirror." In this regard, multiple configurations of the spectral filter 100 may obtain the same or substantially similar results. For example, the spectral filter 100 may be configured to remove unneeded IR radiation from the spectrum of the input beam 106 by including a beam dump 302 in the path of the transmitted filtered beam 112 with the concave surface 104 configured as a "cold mirror" with a selected cutoff wavelength defining the maximum desired wavelength of the desired spectrum in the reflected filtered beam 114. By way of another example, the spectral filter 100 may be configured to remove unneeded IR radiation from the spectrum of the input beam 106 by including a beam dump 302 in the path of the reflected filtered beam 114 with the concave surface 104 configured as a "hot mirror" with a selected cutoff wavelength defining the maximum desired wavelength of the desired spectrum in the transmitted filtered beam 112.

The curved filtering element 102 may be implemented using any combination of materials and mounting structures suitable for providing a concave surface 104 to receive the diverging input beam 106 from the output face 108 and generate the transmitted filtered beam 112 and the reflected filtered beam 114. Further, the diverging input beam 106 may propagate through any material or combination of materials between the output face 108 of the optical fiber 110 and the concave surface 104. For example, the diverging input beam 106 may propagate through atmosphere, a controlled gaseous environment (e.g., argon gas, or the like), a vacuum (e.g., a reduced atmosphere environment bounded by a vacuum chamber), or a solid material (e.g., a transparent optical material).

In one embodiment, as illustrated in at least FIG. 1A, the curved filtering element 102 is formed as a discrete optical element placed at a distance from the optical fiber 110. For example, the curved filtering element 102 may include the concave surface 104 as an input surface aligned to receive the diverging input beam 106 and may further include an exit surface 124. Accordingly, the transmitted filtered beam 112 may propagate through the curved filtering element 102 and exit the curved filtering element 102 through the exit surface 124, while the reflected filtered beam 114 may be reflected off of the incident concave surface 104. A curved filtering element 102 configured in this regard may thus be formed from an optical substrate (e.g., a substrate transparent to at least a portion of the transmitted filtered beam 112) such as, but not limited to, silica, quartz, or borosilicate glass.

Further, the spectral filter 100 may include one or more alignment structures suitable for aligning the collector 116 and/or the optical fiber 110 with respect to the curvature center 118 of the concave surface 104. For example, the spectral filter 100 may include fiber mounts to mount the output face 108 and/or the face of a fiber collector 116 at a desired and possibly fixed position with respect to the curvature center 118. By way of another example, the spectral filter 100 may include a mirror mount to locate the reflective surface 122 of a mirrored collector 116 at a desired and possibly fixed position with respect to the curvature center 118. Further, fiber mounts and/or the mirror mounts may be integrated with a mount for the curved filtering element 102 to provide an integrated platform.

Figure 4:
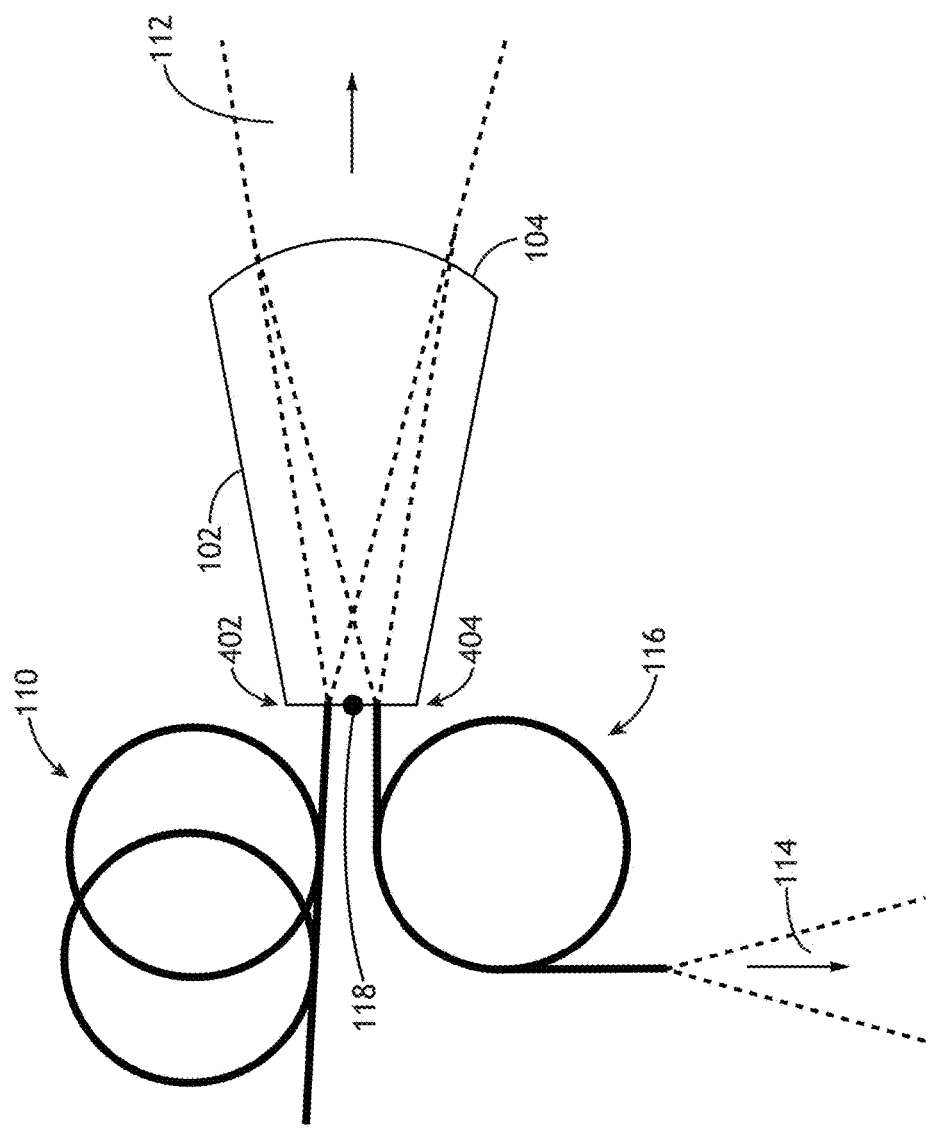
FIG. 4 is a conceptual view of a spectral filter including a curved filtering element coupled to the optical fiber providing the input beam and coupled to a fiber collector, in accordance with one or more embodiments of the present disclosure.

In another embodiment, the curved filtering element 102 is formed as an optical element configured to couple with the output face 108 and/or the collector 116. FIG. 4 is a conceptual view of a spectral filter 100 including a curved filtering element 102 coupled to the optical fiber 110 providing the input beam 106 and coupled to a fiber collector 116, in accordance with one or more embodiments of the present disclosure. In one embodiment, the curved filtering element 102 is formed from a transparent material configured to extend from the output face 108 of the optical fiber 110 to the concave surface 104. For example, the curved filtering element 102 may include an input coupling face 402 for optically coupling with the output face 108 of the optical fiber 110 such that the diverging input beam 106 may propagate through the volume of the curved filtering element 102 to the concave surface 104. Accordingly, the concave surface 104 may operate as an exit surface for the transmitted filtered beam 112. By way of another example, the curved filtering element 102 may include a collector coupling face 404 for optically coupling with the collector 116 such that the reflected filtered beam 114 may pass through the collector coupling face 404 to the collector 116. A curved filtering element 102 configured in this regard may thus be formed from an optical material (e.g., a volume of material transparent to the input beam 106 and the reflected filtered beam 114) such as, but not limited to, silica, quartz, or borosilicate glass.

In another embodiment, at least one of the input coupling face 402 or the collector coupling face 404 is configured to be fused to a fiber and/or a fiber mount. In this regard, the optical fiber 110 and/or a fiber collector 116 may be physically joined with the curved filtering element 102. It is recognized herein that fusing a fiber and/or a fiber mount with the curved filtering element 102 may facilitate a robust alignment of the spectral filter 100 with respect to the input beam 106.

It is to be understood that the specific configuration of the spectral filter 100 provided in FIG. 4, as well as the associated descriptions above, is provided solely for illustrative purposes and should not be interpreted as limiting. For example, the input coupling face 402 and the collector coupling face 404 may be formed as a single face as illustrated in FIG. 4, which may be planar or curved. By way of another example, the input coupling face 402 and the collector coupling face 404 may be angled with respect to each other to facilitate coupling. Further, the curved filtering element 102 may have any shape and/or any number of faces suitable for coupling with the optical fiber 110 and/or the collector 116. For example, the curved filtering element 102 may include a polished collector coupling face 404 through which the reflected filtered beam 114 may propagate to a discrete collector 116 (e.g., a mirrored collector 116).

It is recognized herein that a brightness-preserving spectral filter 100 may be provided as a stand-alone device (e.g., uncoupled to any input illumination source) or may be integrated into external systems. In one embodiment, the spectral filter 100 is integrated with a fiber-based illumination source to provide spectrally-filtered broadband illumination. Accordingly, an illumination source as well as the optical fiber 110 through which the input beam 106 is provided may be physically packaged and/or coupled to one or more components of the spectral filter 100. In another embodiment, the spectral filter 100 is integrated into a system for directing spectrally-filtered light to a sample.

Figure 5:
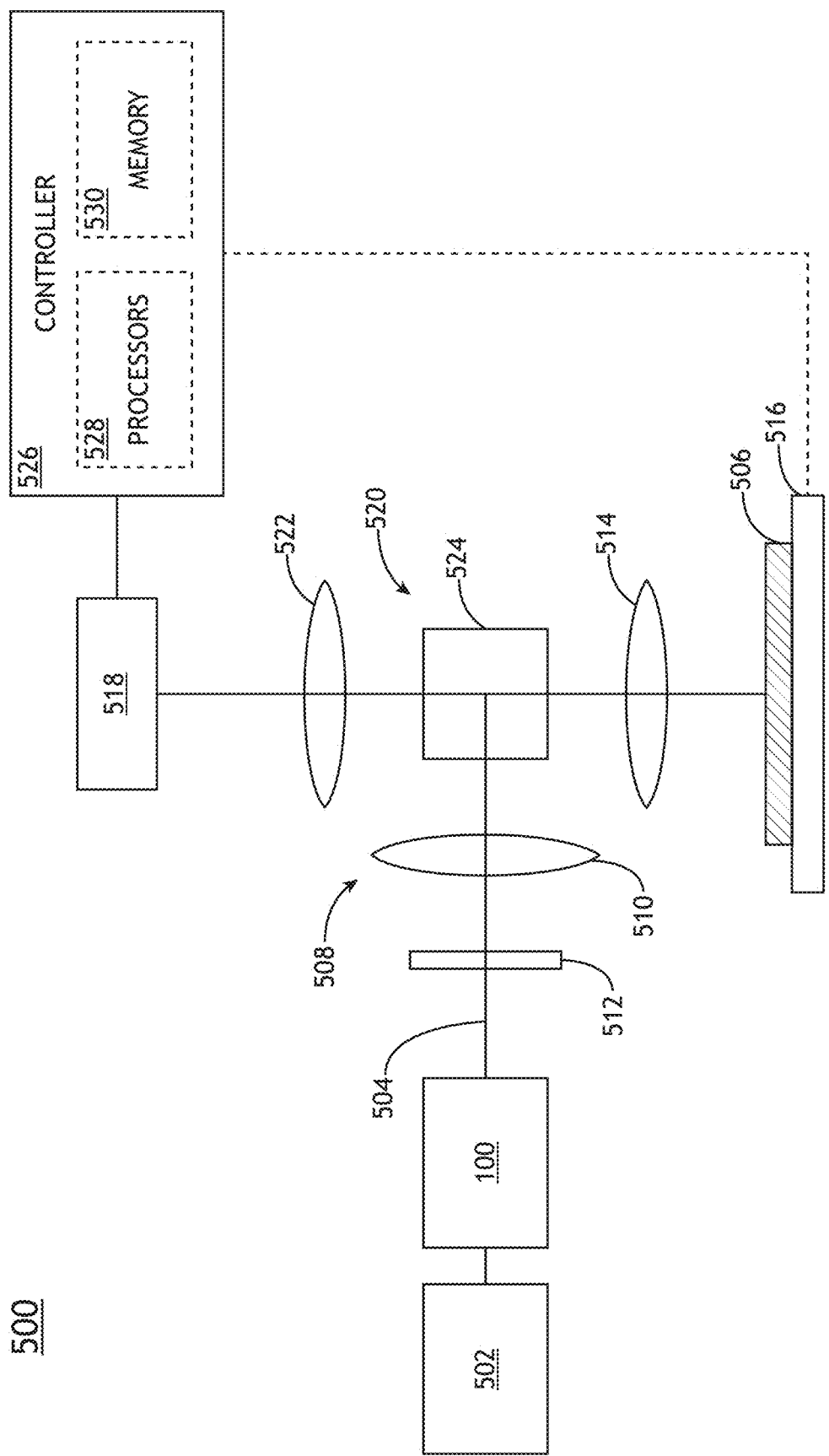
FIG. 5 is a conceptual view of a metrology system including a brightness-preserving spectral filter for providing spectrally-filtered broadband illumination to a sample, in accordance with one or more embodiments of the present disclosure.

FIG. 5 is a conceptual view of a metrology system 500 including a brightness-preserving spectral filter 100 for providing spectrally-filtered broadband illumination to a sample, in accordance with one or more embodiments of the present disclosure. In one embodiment, the metrology system 500 includes an image-based metrology tool to measure alignment data based on the generation of one or more images of a sample. In another embodiment, the metrology system 500 includes a scatterometry-based metrology tool to measure metrology data based on the scattering (reflection, diffraction, diffuse scattering, or the like) of light from the sample.

In one embodiment, the metrology system 500 includes a spectral filter 100 configured to provide spectral filtering of a fiber-based illumination source 502, as described previously herein. The metrology system 500 may direct at least one filtered output beam (e.g., the transmitted filtered beam 112 and/or the reflected filtered beam 114 from the spectral filter 100) as an illumination beam 504 to a sample 506 via an illumination pathway 508. The illumination pathway 508 may include one or more lenses 510 or additional optical components 512 suitable for modifying and/or conditioning the illumination beam 504. For example, the one or more optical components 512 may include, but are not limited to, one or more polarizers, one or more filters, one or more beam splitters, one or more diffusers, one or more homogenizers, one or more apodizers, or one or more beam shapers. In another embodiment, the spectral filter 100 includes an objective lens 514 to focus the illumination beam 504 onto the sample 506.

In another embodiment, the sample 506 is disposed on a sample stage 516. The sample stage 516 may include any device suitable for positioning the sample 506 within the metrology system 500. For example, the sample stage 516 may include any combination of linear translation stages, rotational stages, tip/tilt stages, or the like.

In another embodiment, the metrology system 500 includes a detector 518 configured to capture radiation emanating from the sample 506 through a collection pathway 520. For example, the collection pathway 520 may include, but is not required to include, a collection lens (e.g., the objective lens 514 or one or more additional collection pathway lenses 522). By way of another example, a detector 518 may receive radiation reflected or scattered (e.g., via specular reflection, diffuse reflection, and the like) from the sample 506. By way of another example, a detector 518 may receive radiation generated by the sample 506 (e.g., luminescence associated with absorption of the illumination beam 504, or the like).

The detector 518 may include any type of optical detector known in the art suitable for measuring illumination received from the sample 506. For example, a detector 518 may include, but is not limited to, a CCD detector, a TDI detector, a photomultiplier tube (PMT), an avalanche photodiode (APD), or the like. In another embodiment, a detector 518 may include a spectroscopic detector suitable for identifying wavelengths of radiation emanating from the sample 506. In another embodiment, the metrology system 500 may include multiple detectors 518 (e.g., associated with multiple beam paths generated by one or more beamsplitters) to facilitate multiple metrology measurements (e.g., multiple metrology tools) by the metrology system 500.

The collection pathway 520 may further include any number of optical elements to direct and/or modify illumination collected by the objective lens 514 including, but not limited to, one or more collection pathway lenses 522, one or more filters, one or more polarizers, or one or more beam blocks.

In one embodiment, as illustrated in FIG. 5, the metrology system 500 includes a beamsplitter 524 oriented such that the objective lens 514 may simultaneously direct the illumination beam 504 to the sample 506 and collect radiation emanating from the sample 506. In this regard, the metrology system 500 may be configured in an epi-illumination mode.

In another embodiment, the metrology system 500 includes a controller 526. In another embodiment, the controller 526 includes one or more processors 528 configured to execute program instructions maintained on a memory medium 530. In this regard, the one or more processors 528 of controller 526 may execute any of the various process steps described throughout the present disclosure. Further, the controller 526 may be configured to receive data including, but not limited to, metrology data (e.g., alignment measurement results, images of the target, pupil images, and the like) or metrology metrics (e.g., precision, tool-induced shift, sensitivity, diffraction efficiency, and the like).

The one or more processors 528 of a controller 526 may include any processing element known in the art. In this sense, the one or more processors 528 may include any microprocessor-type device configured to execute algorithms and/or instructions. In one embodiment, the one or more processors 528 may consist of a desktop computer, mainframe computer system, workstation, image computer, parallel processor, or any other computer system (e.g., networked computer) configured to execute a program configured to operate the metrology system 500, as described throughout the present disclosure. It is further recognized that the term "processor" may be broadly defined to encompass any device having one or more processing elements, which execute program instructions from a non-transitory memory medium 530. Further, the steps described throughout the present disclosure may be carried out by a single controller 526 or, alternatively, multiple controllers. Additionally, the controller 526 may include one or more controllers housed in a common housing or within multiple housings. In this way, any controller or combination of controllers may be separately packaged as a module suitable for integration into metrology system 500. Further, the controller 526 may analyze data received from the detector 518 and feed the data to additional components within the metrology system 500 or external to the metrology system 500.

The memory medium 530 may include any storage medium known in the art suitable for storing program instructions executable by the associated one or more processors 528. For example, the memory medium 530 may include a non-transitory memory medium. By way of another example, the memory medium 530 may include, but is not limited to, a read-only memory, a random access memory, a magnetic or optical memory device (e.g., disk), a magnetic tape, a solid state drive, and the like. It is further noted that memory medium 530 may be housed in a common controller housing with the one or more processors 528. In one embodiment, the memory medium 530 may be located remotely with respect to the physical location of the one or more processors 528 and controller 526. For instance, the one or more processors 528 of controller 526 may access a remote memory (e.g., server), accessible through a network (e.g., internet, intranet, and the like). Therefore, the above description should not be interpreted as a limitation on the present invention but merely an illustration.

In another embodiment, the controller 526 is communicatively coupled to one or more elements of the metrology system 500 to provide metrology data associated with the illumination of the sample 506 with the spectrally-filtered illumination from the spectral filter 100.

Figure 6:
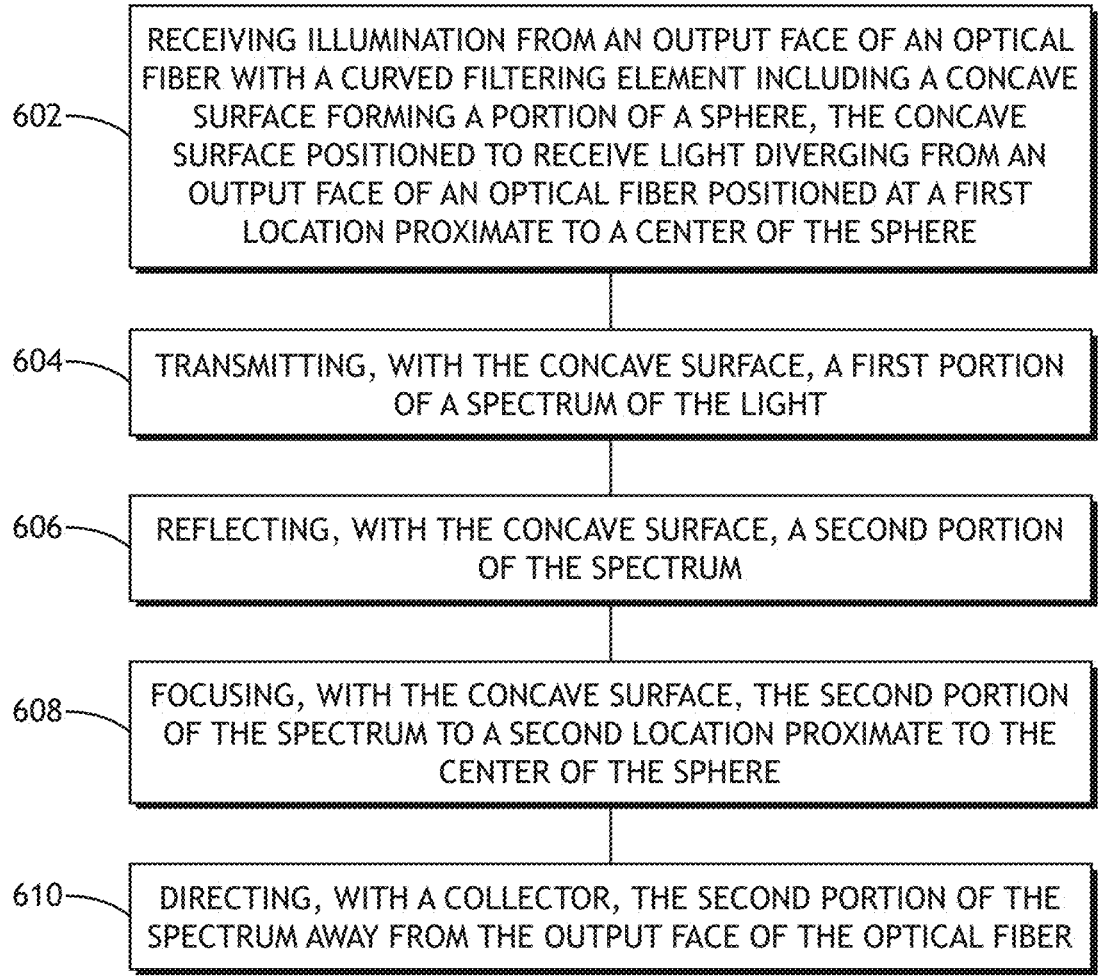
FIG. 6 is a flow diagram illustrating steps performed in a method for spectrally-filtering illumination from a fiber, in accordance with one or more embodiments of the present disclosure.

FIG. 6 is a flow diagram illustrating steps performed in a method 600 for spectrally-filtering illumination from a fiber, in accordance with one or more embodiments of the present disclosure. Applicant notes that the embodiments and enabling technologies described previously herein in the context of spectral filter 100 should be interpreted to extend to method 600. It is further noted, however, that the method 600 is not limited to the architecture of spectral filter 100.

In one embodiment, the method 600 includes a step 602 of receiving illumination from an output face of an optical fiber with a curved filtering element including a concave surface forming a portion of a sphere in which the concave surface is positioned to receive light diverging from an output face of an optical fiber positioned at a first location proximate to a center of the sphere. For example, the concave surface may be shaped as a spherical optical element that corresponds to a portion of a sphere. Diverging light from an optical fiber at a location proximate to the center of the sphere may thus be collected by the concave surface of the curved filtering element. The curved filtering element may include a discrete optical element separated from the optical fiber or may be directly coupled to the optical fiber to provide robust alignment.

In one embodiment, the method 600 includes a step 604 of transmitting, with the concave surface, a first portion of a spectrum of the light. In one embodiment, the method 600 includes a step 606 of reflecting, with the concave surface, a second portion of the spectrum. For example, the concave surface may include a wavelength-selective coating suitable for splitting the spectrum of the light diverging from the output face of the optical fiber such that a first portion of the spectrum of the diverging light is transmitted through the concave surface and a second portion of the spectrum is reflected. The concave surface may include any number of material layers (e.g., dielectric layers, metallic layers, or the like) suitable for providing wavelength-selective filtering. Further, the concave surface may operate as any type of filter. In one instance, the curved surface may operate as a "cold mirror" by reflecting wavelengths lower than a selected cutoff wavelength and transmitting wavelengths higher than the selective cutoff wavelength. In another instance, the curved surface may operate as a "hot mirror" by transmitting wavelengths lower than a selected cutoff wavelength and reflecting wavelengths higher than the selective cutoff wavelength.

In one embodiment, the method 600 includes a step 608 of focusing, with the concave surface, the second portion of the spectrum to a second location proximate to the center of the sphere. A spherical concave surface may reflect light from the output face of the optical fiber located at a first location proximate to the center of the sphere to a second location proximate to the center of the sphere. For example, positioning the core of the optical fiber physically close to the center of the sphere (e.g., at a distance approximately equal to the radius of the center of the optical fiber) may facilitate tight focusing of the second portion of the spectrum such that the filtered beam associated with the second portion of the spectrum may have the same or substantially the same brightness as the input light incident on the concave surface.

In one embodiment, the method 600 includes a step 610 of directing, with a collector, the second portion of the spectrum away from the output face of the optical fiber. A collector may include any type of element suitable for collecting the second portion of the spectrum and directing this second portion of the spectrum away from the output face of the optical fiber. For example, the collector may include, but is not limited to, an additional optical fiber with an output face at the second location (e.g., the focused location associated with step 608), or a reflective surface positioned to redirect the second portion of the spectrum. In this regard, the second portion of the spectrum may be filtered from the light diverging from the optical fiber without damage to the optical fiber or any external optical elements.

Further, method 600 may include providing the first portion of the spectrum and/or the second portion of the spectrum as filtered output beams suitable for use by external systems.

The herein described subject matter sometimes illustrates different components contained within, or connected with, other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "connected," or "coupled" to each other to achieve the desired functionality, and any two components capable of being so associated can also be viewed as being "couplable" to each other to achieve the desired functionality. Specific examples of couplable include but are not limited to physically interactable and/or physically interacting components and/or wirelessly interactable and/or wirelessly interacting components and/or logically interactable and/or logically interacting components.

It is believed that the present disclosure and many of its attendant advantages will be understood by the foregoing description, and it will be apparent that various changes may be made in the form, construction and arrangement of the components without departing from the disclosed subject matter or without sacrificing all of its material advantages. The form described is merely explanatory, and it is the intention of the following claims to encompass and include such changes. Furthermore, it is to be understood that the invention is defined by the appended claims.

What is claimed:

1. A spectral filter comprising:
a curved filtering element including a concave surface forming a portion of a sphere, the concave surface formed as a polished optical surface, the concave surface positioned to receive light diverging from an output face of an optical fiber positioned at a first location proximate to a center of the sphere, the concave surface further including a wavelength-selective coating configured to transmit a first portion of a spectrum of the light and reflect a second portion of the spectrum of the light, wherein the first and second portions of the spectrum provide a broadband spectral range separated by a selected cutoff wavelength such that the wavelength-selective coating is one of a high-pass or a low-pass spectral filter with respect to the selected cutoff wavelength, the concave surface further configured to reflect and focus the second portion of the spectrum to a second location proximate to the center of the sphere; and a collector configured to direct the second portion of the spectrum away from the output face of the optical fiber.

2. The spectral filter of claim 1, wherein the collector comprises:
an additional optical fiber with an input face at the second location to receive the second portion of the spectrum.

3. The spectral filter of claim 1, wherein the collector comprises:
a mirror located at the second location proximate to the center of the sphere and oriented to direct the second portion of the spectrum away from the output face of the optical fiber.

4. The spectral filter of claim 1, wherein the curved filtering element further includes an exit surface positioned to receive the fiarst portion of the spectrum from the concave surface, wherein the first portion of the spectrum exits the curved filtering element through the exit surface.

5. The spectral filter of claim 4, wherein the exit surface is shaped to mitigate aberration induced by the concave surface.

6. The spectral filter of claim 1, wherein the curved filtering element further includes an input surface coupled to the output face of the optical fiber to receive the light diverging from the output face of the optical fiber, wherein the first portion of the spectrum exits the curved filtering element through the concave surface.

7. The spectral filter of claim 6, wherein the curved filtering element further includes an exit surface positioned at the second location, wherein the second portion of the spectrum exits the curved filtering element through the exit surface.

8. The spectral filter of claim 7, wherein the collector comprises:
an additional optical fiber with an input face coupled to the exit surface to receive the second portion of the spectrum.

9. The spectral filter of claim 1, further comprising:
a collimating optical element positioned to collimate the first portion of the spectrum transmitted through the concave surface.

10. The spectral filter of claim 1, further comprising:
a collimating optical element positioned to collimate the second portion of the spectrum directed away from the output face of the optical fiber by the collector.

11. The spectral filter of claim 1, further comprising:
a beam dump positioned to receive one of the first portion of the spectrum transmitted through the concave surface or the second portion of the spectrum directed away from the output face of the optical fiber by the collector.

12. The spectral filter of claim 1, wherein the curved surface includes a high-pass reflective filter with a selected cutoff wavelength, wherein the first portion of the spectrum includes wavelengths lower than the selected cutoff wavelength, wherein the second portion of the spectrum includes wavelengths higher than the selected cutoff wavelength.

13. The spectral filter of claim 12, wherein the selected cutoff wavelength is in the infrared spectral region.

14. The spectral filter of claim 1, wherein the curved surface comprises:
a low-pass reflective filter with a selected cutoff wavelength, wherein the first portion of the spectrum includes wavelengths higher than the selected cutoff wavelength, wherein the second portion of the spectrum includes wavelengths lower than the selected cutoff wavelength.

15. The spectral filter of claim 14, wherein the selected cutoff wavelength is in the infrared spectral region.

16. The spectral filter of claim 1, wherein the wavelength-selective coating comprises:
one or more dielectric layers.

17. The spectral filter of claim 1, wherein the wavelength-selective coating comprises:
one or more metallic layers.

18. A filtered fiber illumination source comprising:
a fiber illumination source configured to provide broadband illumination diverging from an output face of an optical fiber;
a curved filtering element including a concave surface forming a portion of a sphere, the concave surface formed as a polished optical surface, the concave surface positioned to receive the broadband illumination diverging from the output face of the optical fiber, the output face of the optical fiber positioned at a first location proximate to a center of the sphere, the concave surface further including a wavelength-selective coating configured to transmit a first portion of a spectrum of the broadband illumination and reflect a second portion of the spectrum of the broadband illumination, wherein the first and second portions of the spectrum provide a broadband spectral range separated by a selected cutoff wavelength such that the wavelength-selective coating is one of a high-pass or a low-pass spectral filter with respect to the selected cutoff wavelength, the concave surface further configured to reflect and focus the second portion of the spectrum to a second location proximate to the center of the sphere; and
a collector configured to direct the second portion of the spectrum away from the output face of the optical fiber.

19. The filtered fiber illumination source of claim 18, wherein the fiber illumination source comprises:
a supercontinuum laser source.

20. The filtered fiber illumination source of claim 18, wherein the collector comprises:
an additional optical fiber with an input face at the second location to receive the second portion of the spectrum.

21. The filtered fiber illumination source of claim 18, wherein the collector comprises:
a mirror located at the second location proximate to the center of the sphere and oriented to direct the second portion of the spectrum away from the output face of the optical fiber.

22. The filtered fiber illumination source of claim 18, wherein the curved filtering element further includes an exit surface positioned to receive the first portion of the spectrum from the concave surface, wherein the first portion of the spectrum exits the curved filtering element through the exit surface.

23. The filtered fiber illumination source of claim 18, wherein the curved filtering element further includes an input surface coupled to the output face of the optical fiber to receive the light diverging from the output face of the optical fiber.

24. The filtered fiber illumination source of claim 23, wherein the curved filtering element further includes an exit surface positioned at the second location, wherein the second portion of the spectrum exits the curved filtering element through the exit surface.

25. The filtered fiber illumination source of claim 24, wherein the collector comprises:
an additional optical fiber with an input face coupled to the exit surface to receive the second portion of the spectrum.

26. The filtered fiber illumination source of claim 18, further comprising:
a collimating optical element positioned to collimate the first portion of the spectrum transmitted through the concave surface.

27. The filtered fiber illumination source of claim 18, further comprising:
a collimating optical element positioned to collimate the second portion of the spectrum directed away from the output face of the optical fiber by the collector.

28. The filtered fiber illumination source of claim 18, further comprising:
a beam dump positioned to receive one of the first portion of the spectrum transmitted through the concave surface or the second portion of the spectrum directed away from the output face of the optical fiber by the collector.

29. The filtered fiber illumination source of claim 18, wherein the wavelength-selective coating is a high-pass reflective filter with the selected cutoff wavelength.

30. The filtered fiber illumination source of claim 29, wherein the selected cutoff wavelength is in the infrared spectral region.

31. The filtered fiber illumination source of claim 18, wherein the curved surface is a low-pass reflective filter with the selected cutoff wavelength.

32. The filtered fiber illumination source of claim 31, wherein the selected cutoff wavelength is in the infrared spectral region.

33. The filtered fiber illumination source of claim 18, wherein the wavelength-selective coating comprises:
at least one of one or more dielectric layers or one or more metallic layers.

34. A method for filtering illumination from an optical fiber comprising:
receiving illumination from an output face of an optical fiber with a curved filtering element including a concave surface forming a portion of a sphere, the concave surface formed as a polished optical surface, the concave surface positioned to receive light diverging from an output face of an optical fiber positioned at a first location proximate to a center of the sphere;
transmitting, with a wavelength-selective coating on the concave surface, a first portion of a spectrum of the illumination;
reflecting, with the wavelength-selective coating on the concave surface, a second portion of the spectrum, wherein the first and second portions of the spectrum provide a broadband spectral range separated by a selected cutoff wavelength such that the wavelength-selective coating is one of a high-pass or a low-pass spectral filter with respect to the selected cutoff wavelength;
focusing, with the concave surface, the second portion of the spectrum to a second location proximate to the center of the sphere; and
directing, with a collector, the second portion of the spectrum away from the output face of the optical fiber.

* * * * *